US012565212B2

(12) United States Patent (10) Patent No.: US 12,565,212 B2
Morii (45) Date of Patent: Mar. 3, 2026

(54) INFORMATION PROCESSING DEVICE, NON-TRANSITORY STORAGE MEDIUM, AND INFORMATION PROCESSING METHOD

(71) Applicant: TOYOTA JIDOSHA KABUSHIKI KAISHA, Toyota (JP)

(72) Inventor: Nanako Morii, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1 day.

(21) Appl. No.: 18/633,602

(22) Filed: Apr. 12, 2024

(65) Prior Publication Data

US 2024/0253636 A1 Aug. 1, 2024

(30) Foreign Application Priority Data

May 26, 2023 (JP) ................................. 2023-087041

(51) Int. Cl.
*B60W 30/18* (2012.01)
*B60W 10/18* (2012.01)

(52) U.S. Cl.
CPC ...... *B60W 30/18127* (2013.01); *B60W 10/18* (2013.01); *B60W 2510/06* (2013.01); *B60W 2556/10* (2020.02)

(58) Field of Classification Search
CPC ........... B60W 30/18127; B60W 10/18; B60W 2510/06; B60W 2556/10
See application file for complete search history.

(56) References Cited

U.S. PATENT DOCUMENTS

| | | | | |
|---|---|---|---|---|
| 10,787,156 | B2 * | 9/2020 | Dirgo ..................... | B60T 17/221 |
| 11,049,333 | B2 * | 6/2021 | Tucker .............. | G05B 23/0283 |
| 11,402,817 | B2 * | 8/2022 | Kubo ................. | G05B 19/4065 |
| 12,124,231 | B2 * | 10/2024 | Zhang .................. | G05B 23/024 |
| 2016/0035155 | A1 * | 2/2016 | Rice ......................... | F16H 61/12 701/51 |
| 2020/0357200 | A1 * | 11/2020 | Wang .................... | G07C 5/0841 |
| 2022/0042472 | A1 * | 2/2022 | Domingos .............. | B61L 27/12 |
| 2022/0350325 | A1 * | 11/2022 | Cooper ................. | B60C 11/243 |
| 2023/0192107 | A1 * | 6/2023 | Ueno .................... | B60W 60/00 701/1 |

FOREIGN PATENT DOCUMENTS

| | | |
|---|---|---|
| JP | 2005-078586 A | 3/2005 |
| JP | 2012-068366 A | 4/2012 |
| JP | 2018-505642 A | 2/2018 |
| WO | 2016/112926 A1 | 7/2016 |

* cited by examiner

*Primary Examiner* — George C Jin
(74) *Attorney, Agent, or Firm* — Oliff PLC

(57) ABSTRACT

An information processing device includes a processor configured to: acquire a usage history of a first device included in a vehicle as a first usage history; acquire a usage history of a second device included in the vehicle and different from the first device as a second usage history; estimate a first replacement time to replace a first consumable part included in the first device based on the first usage history; estimate a second replacement time to replace a second consumable part included in the second device based on the second usage history; and when a necessary condition that the second replacement time is later than the first replacement time is satisfied, change control for the first device so as to reduce wear of the first consumable part compared to when the second replacement time is the same as or earlier than the first replacement time.

4 Claims, 3 Drawing Sheets

INFORMATION PROCESSING DEVICE, NON-TRANSITORY STORAGE MEDIUM, AND INFORMATION PROCESSING METHOD

CROSS-REFERENCE TO RELATED APPLICATION

This application claims priority to Japanese Patent Application No. 2023-087041 filed on May 26, 2023, incorporated herein by reference in its entirety.

BACKGROUND

1. Technical Field

The present disclosure relates to information processing devices, non-transitory storage media, and information processing methods.

2. Description of Related Art

A vehicle management information providing system disclosed in Japanese Unexamined Patent Application Publication No. 2005-078586 (JP 2005-078586 A) includes a computer group. This computer group estimates the time to replace a specific part included in a vehicle. Specifically, the computer group calculates an average replacement interval for a specific vehicle model as an average replacement interval of the specific part in the same vehicle model as a target user vehicle. The computer group also calculates an average replacement interval for the user vehicle as an average replacement period of the specific part in the target user vehicle. The computer group also calculates a replacement time correction value for an individual user based on the average replacement interval for the specific vehicle model and the average replacement interval for the user vehicle. The computer group then estimates the next replacement time of the specific part in the target user vehicle based on when the specific part was last replaced, a predetermined service life of the specific part, and the replacement time correction value for the individual user.

SUMMARY

Each of a plurality of types of parts included in a vehicle has a service life. When a certain type of part reaches its service life, maintenance such as replacement of the part is necessary. When the time to replace a part varies depending on the type of part, maintenance needs to be performed every time a part reaches its service life, which may increase the overall frequency of maintenance of the vehicle.

An information processing device according to a first aspect of the present disclosure includes a processor configured to: acquire a usage history of a first device included in a vehicle as a first usage history; acquire a usage history of a second device included in the vehicle as a second usage history, the second device being a device different from the first device; estimate a first replacement time based on the first usage history, the first replacement time being a time to replace a first consumable part included in the first device; estimate a second replacement time based on the second usage history, the second replacement time being a time to replace a second consumable part included in the second device; and when a necessary condition that the second replacement time is later than the first replacement time is satisfied, change control for the first device so as to reduce wear of the first consumable part compared to when the second replacement time is the same as or earlier than the first replacement time.

A non-transitory storage medium according to a second aspect of the present disclosure is a non-transitory storage medium storing instructions that are executable by one or more processors and that cause the one or more processors to perform functions. The functions include causing an information processing device to: acquire a usage history of a first device included in a vehicle as a first usage history; acquire a usage history of a second device included in the vehicle as a second usage history, the second device being a device different from the first device; estimate a first replacement time based on the first usage history, the first replacement time being a time to replace a first consumable part included in the first device; estimate a second replacement time based on the second usage history, the second replacement time being a time to replace a second consumable part included in the second device; and when a necessary condition that the second replacement time is later than the first replacement time is satisfied, change control for the first device so as to reduce wear of the first consumable part compared to when the second replacement time is the same as or earlier than the first replacement time.

An information processing method according to a third aspect of the present disclosure includes causing an information processing device to: acquire a usage history of a first device included in a vehicle as a first usage history; acquire a usage history of a second device included in the vehicle as a second usage history, the second device being a device different from the first device; estimate a first replacement time based on the first usage history, the first replacement time being a time to replace a first consumable part included in the first device; estimate a second replacement time based on the second usage history, the second replacement time being a time to replace a second consumable part included in the second device; and when a necessary condition that the second replacement time is later than the first replacement time is satisfied, change control for the first device so as to reduce wear of the first consumable part compared to when the second replacement time is the same as or earlier than the first replacement time.

According to the above configuration, as a result of changing the control for the first device so as to reduce wear of the first consumable part, the first replacement time gets closer to the second replacement time. This increases the possibility that the first consumable part and the second consumable part can be replaced at the same time. As a result, a reduction in overall frequency of maintenance of the vehicle can be expected.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Schematic Configuration of Vehicle

An embodiment of the present disclosure will be described below with reference to FIGS. 1 to 4. First, a schematic configuration of a vehicle 100 will be described.

Figure 1:
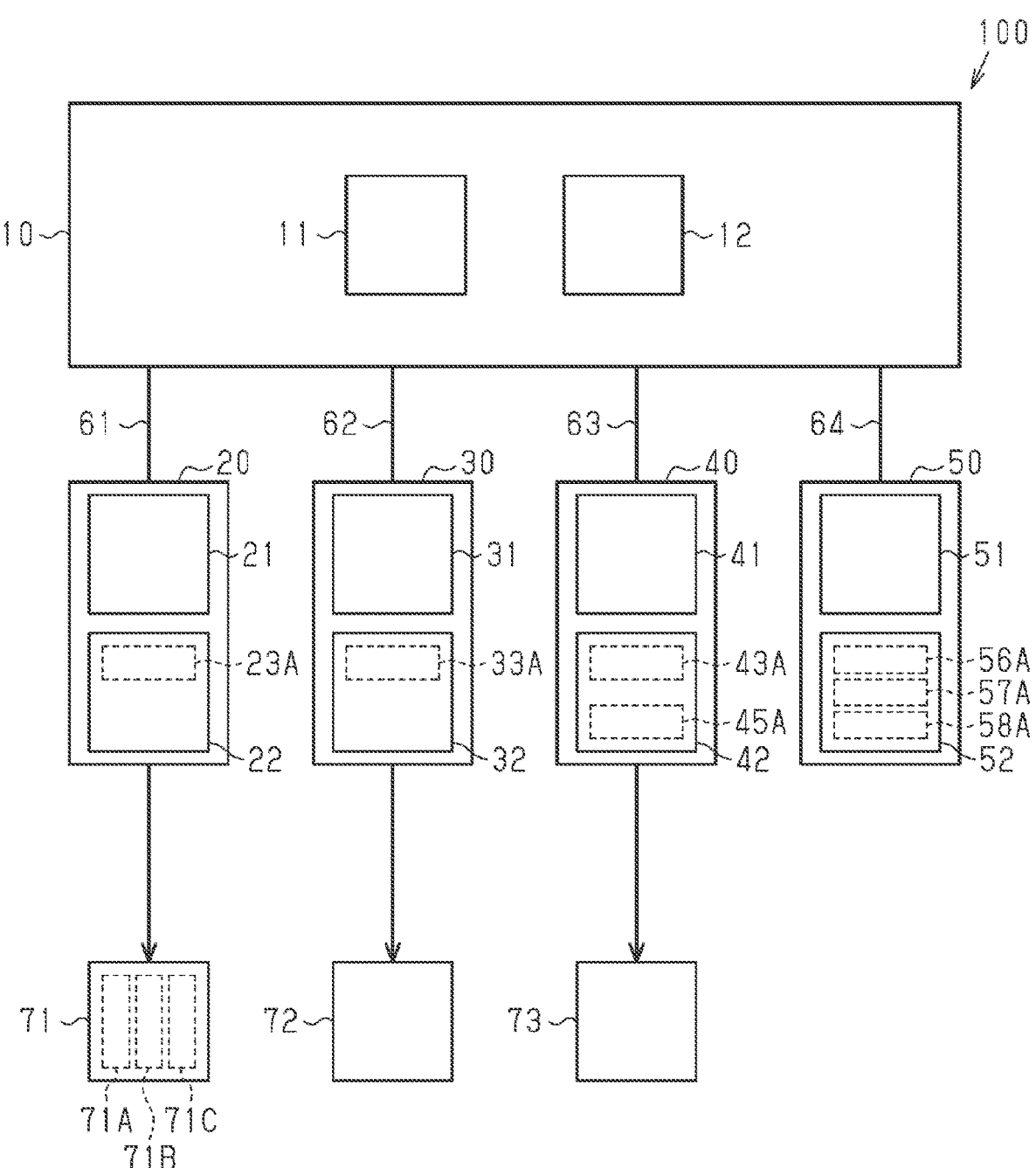
FIG. 1 is a schematic configuration diagram of a vehicle.

As shown in FIG. 1, the vehicle 100 includes a powertrain device 71, a steering system 72, and a brake device 73. The powertrain device 71 includes an internal combustion engine 71A, a motor generator 71B, and a transmission 71C. The internal combustion engine 71A can apply a driving force to drive wheels of the vehicle 100 via the transmission 71C. That is, the internal combustion engine 71A functions as a driving source for the vehicle 100. The internal combustion engine 71A can consume the traction energy of the vehicle 100 through pumping loss of the internal combustion engine 71A by applying the traction energy from the drive wheels of the vehicle 100 to a crankshaft of the internal combustion engine 71A. That is, the internal combustion engine 71A can apply a braking force to the drive wheels of the vehicle 100 by so-called engine braking. The motor generator 71B can apply a driving force to the drive wheels of the vehicle 100 via the transmission 71C. That is, the motor generator 71B functions as a driving source for the vehicle 100 by operating as an electric motor. The motor generator 71B can consume the traction energy of the vehicle 100 by converting the traction energy from the drive wheels of the vehicle 100 to electrical energy. That is, the motor generator 71B can apply a braking force to the drive wheels of the vehicle 100 by so-called regenerative braking. In other words, the motor generator 71B can generate a braking force for the vehicle 100 by operating as an electric generator.

An example of the steering system 72 is a rack and pinion electric steering system. The steering system 72 can change the orientation of steered wheels of the vehicle 100 by controlling a rack and a pinion, not shown.

The brake device 73 is a so-called mechanical brake device that mechanically brakes the wheels of the vehicle 100. That is, the brake device 73 can generate a braking force for the vehicle 100. In the present embodiment, the brake device 73 includes a disc brake. A disc brake is an example of a friction brake.

As shown in FIG. 1, the vehicle 100 includes a central ECU 10, a powertrain ECU 20, a steering ECU 30, a brake ECU 40, and an advanced driver assistance ECU 50. The vehicle 100 includes a first external bus 61, a second external bus 62, a third external bus 63, and a fourth external bus 64. The term "ECU" is an abbreviation for "electronic control unit."

The central ECU 10 centrally controls the entire vehicle 100. The central ECU 10 includes an execution device 11 and a storage device 12. The storage device 12 stores various programs and various types of data in advance. The storage device 12 includes a read-only memory (ROM) that can only be read, a volatile random access memory (RAM) that can be read and written, and a nonvolatile storage that can be read and written. The execution device 11 implements various processes by executing the programs stored in the storage device 12. An example of the execution device 11 is a central processing unit (CPU).

The powertrain ECU 20 can communicate with the central ECU 10 via the first external bus 61. The powertrain ECU 20 controls the powertrain device 71 by outputting control signals to the powertrain device 71. The powertrain ECU 20 includes an execution device 21 and a storage device 22. The storage device 22 stores various programs and various types of data in advance. The storage device 22 also stores a powertrain application 23A as one of the various programs in advance. The powertrain application 23A is application software for controlling the powertrain device 71. The storage device 22 includes a ROM, a RAM, and a storage. The execution device 21 implements a function as a powertrain control unit 23, which will be described later, by executing the powertrain application 23A stored in the storage device 22. An example of the execution device 21 is a CPU.

The steering ECU 30 can communicate with the central ECU 10 via the second external bus 62, The steering ECU 30 controls the steering system 72 by outputting control signals to the steering system 72. The steering ECU 30 includes an execution device 31 and a storage device 32. The storage device 32 stores various programs and various types of data in advance. The storage device 32 also stores a steering application 33A as one of the various programs in advance. The steering application 33A is application software for controlling the steering system 72. The storage device 32 includes a ROM, a RAM, and a storage. The execution device 31 implements a function as a steering control unit 33, which will be described later, by executing the steering application 33A stored in the storage device 32. An example of the execution device 31 is a CPU.

The brake ECU 40 can communicate with the central ECU 10 via the third external bus 63. The brake ECU 40 controls the brake device 73 by outputting control signals to the brake device 73. The brake ECU 40 includes an execution device 41 and a storage device 42. The storage device 42 stores various programs and various types of data in advance. The storage device 42 stores the date and time oil for lubricating the internal combustion engine 71A was changed. The storage device 42 also stores the date and time a cooling medium for cooling the motor generator 71B was changed. The storage device 42 also stores the date and time brake pads of the brake device 73 were replaced. These dates and times are updated every time the change or replacement is performed. The storage device 42 also stores reference service life of the oil for lubricating the internal combustion engine 71A. The storage device 42 also stores reference service life of the cooling medium for cooling the motor generator 71B. The storage device 42 also stores reference service life of the brake pads of the brake device 73. The reference service life is a reference period from when a consumable part such as oil starts to be used until the consumable part becomes unusable. The reference service life is determined in advance through experiments and simulations. The reference service life is determined individually for each consumable part.

The storage device 42 also stores a brake application 43A as one of the various programs in advance. The brake application 43A is application software for controlling the brake device 73. The storage device 42 further stores a motion manager application 45A as one of the various programs in advance. The motion manager application 45A is application software for arbitrating a plurality of motion requests. The storage device 42 includes a ROM, a RAM, and a storage. The execution device 41 implements a function as a brake control unit 43, which will be described later, by executing the brake application 43A stored in the storage device 42. The execution device 41 also implements a function as a motion manager 45, which will be described later, by executing the motion manager application 45A stored in the storage device 42. An example of the execution device 41 is a CPU. In the present embodiment, the brake ECU 40 is an example of an information processing device.

The motion manager application 45A is an example of an information processing program. Various processes in an information processing method are performed by the execution device 41 executing the motion manager application 45A.

The advanced driver assistance ECU 50 can communicate with the central ECU 10 via the fourth external bus 64. The advanced driver assistance ECU 50 performs various types of driver assistance. The advanced driver assistance ECU 50 includes an execution device 51 and a storage device 52. The storage device 52 stores various programs and various types of data in advance. The various programs include a first assistance application 56A, a second assistance application 57A, and a third assistance application 58A. An example of the first assistance application 56A is application software for collision damage mitigation braking that automatically applies braking to mitigate collision damage to the vehicle 100, that is, so-called autonomous emergency braking (AEB). An example of the second assistance application 57A is application software for so-called lane keeping assist (LKA) that keeps the vehicle 100 in its lane. An example of the third assistance application 58A is application software for so-called adaptive cruise control (ACC) that allows the vehicle 100 to travel while maintaining a constant following distance from a preceding vehicle traveling ahead of the vehicle 100. In the present embodiment, the first assistance application 56A, the second assistance application 57A, and the third assistance application 58A are each application software that implements driver assistance functions of the vehicle 100. The storage device 52 includes a ROM, a RAM, and a storage. The execution device 51 implements a function as a first assistance unit 56, which will be described later, by executing the first assistance application 56A stored in the storage device 52. The execution device 51 also implements a function as a second assistance unit 57, which will be described later, by executing the second assistance application 57A stored in the storage device 52. The execution device 51 also implements a function as a third assistance unit 58, which will be described later, by executing the third assistance application 58A stored in the storage device 52. An example of the execution device 51 is a CPU.

Basic Configuration Related to Motion Manager

Figure 2:
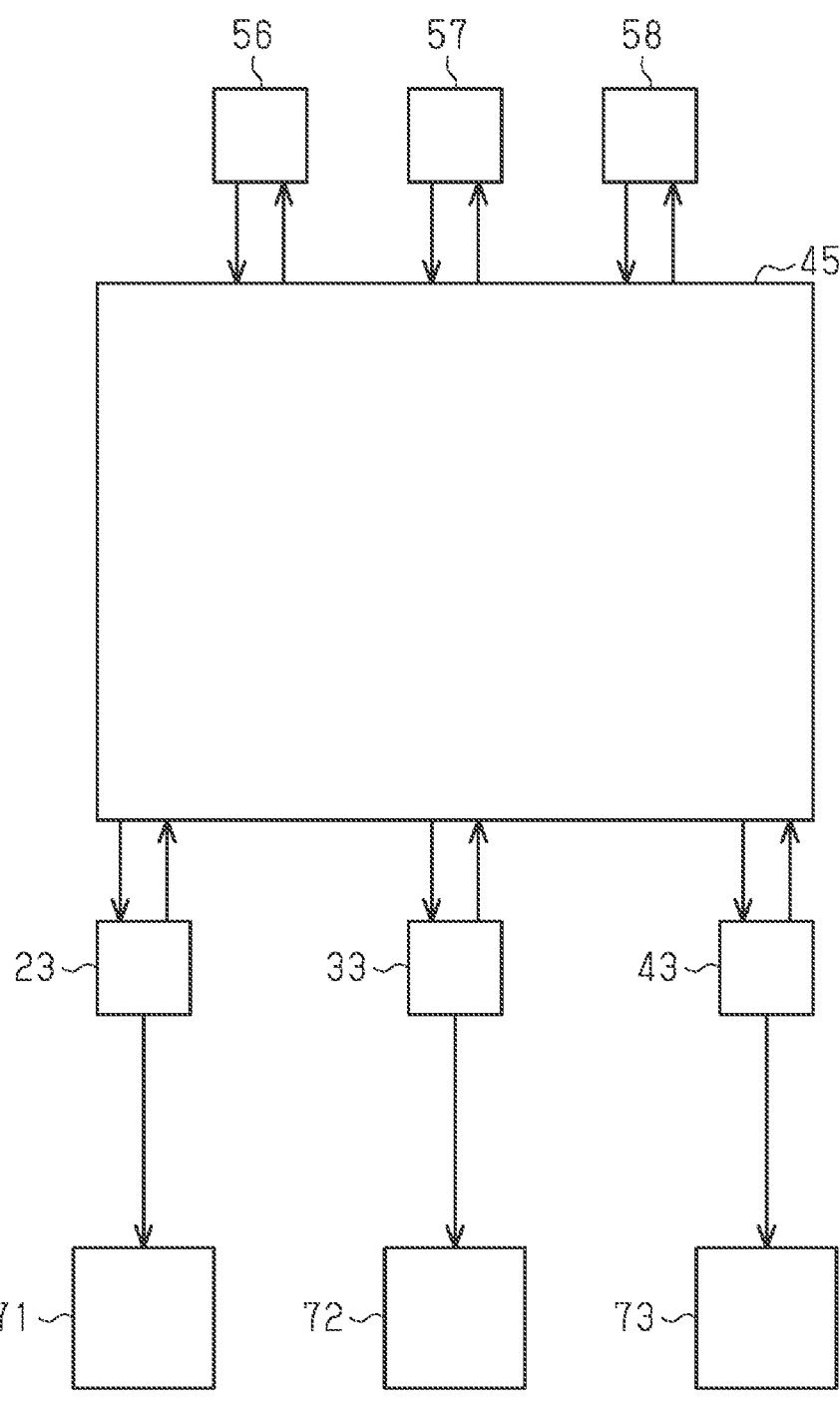
FIG. 2 is a functional block diagram illustrating a basic configuration of a motion manager.

Next, a basic configuration related to the motion manager 45 will be described with reference to FIG. 2. As shown in FIG. 2, the motion manager 45 can communicate with the first assistance unit 56, the second assistance unit 57, and the third assistance unit 58. The motion manager 45 can also communicate with the powertrain control unit 23, the steering control unit 33, and the brake control unit 43.

The first assistance unit 56, the second assistance unit 57, and the third assistance unit 58 output motion requests to the motion manager 45 when performing various types of control. At this time, for example, the first assistance unit 56, the second assistance unit 57, and the third assistance unit 58 continuously output the motion requests from when the various types of control become necessary until such control is no longer necessary. The motion requests include a requested longitudinal acceleration GXR for controlling the acceleration along the longitudinal axis of the vehicle 100.

As shown in FIG. 2, the motion manager 45 receives the motion requests from the first assistance unit 56, the second assistance unit 57, and the third assistance unit 58. The motion manager 45 arbitrates the received motion requests. For example, when the motion manager 45 receives requested longitudinal accelerations GXR from a plurality of assistance units, the motion manager 45 selects the earliest received requested longitudinal acceleration GXR as an arbitration result. For example, when the motion manager 45 receives requested longitudinal accelerations GXR from a plurality of assistance units, the motion manager 45 selects the smallest requested longitudinal acceleration GXR as an arbitration result. The motion manager 45 thus selects a requested longitudinal acceleration GXR according to a predetermined rule. The motion manager 45 then generates instruction values for action requests to control various actuators based on the arbitration result. The various actuators include the powertrain device 71, the steering system 72, and the brake device 73. For example, when controlling the powertrain device 71, the motion manager 45 outputs an instruction value for an action request to the powertrain control unit 23. The powertrain control unit 23 outputs a control signal to the powertrain device 71 based on the instruction value for the action request. In this way, an instruction value output from the motion manager 45 is received by the control unit corresponding to the actuator to be controlled, and the actuator is controlled by the control unit.

Estimation Control

Next, estimation control that is performed by the motion manager 45 will be described with reference to FIG. 3. In the present embodiment, the motion manager 45 performs the estimation control every time a system of the vehicle 100 is turned from off to on. At this time, the motion manager 45 performs the estimation control for each target consumable part. In the present embodiment, the target consumable parts are a consumable part included in the internal combustion engine 71A, a consumable part included in the motor generator 71B, and a consumable part included in the brake device 73. An example of the consumable part included in the internal combustion engine 71A is oil for lubricating each part of the internal combustion engine 71A. An example of the consumable part included in the motor generator 71B is a cooling medium for cooling each part of the motor generator 71B. An example of the consumable part included in the brake device 73 is a brake pad. In the present embodiment, the brake device 73 is a first device. Each of the internal combustion engine 71A and the motor generator 71B is a second device that is a device different from the first device. The consumable part included in the brake device 73 is a first consumable part. Each of the consumable part included in the internal combustion engine 71A and the consumable part included in the motor generator 71B is a second consumable part.

Figure 3:
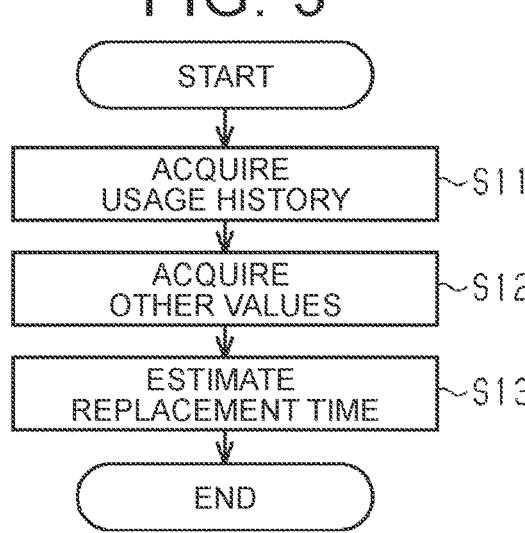
FIG. 3 is a flowchart of estimation control.

As shown in FIG. 3, when the estimation control is started, the motion manager 45 performs step S11. In step S11, the motion manager 45 acquires the usage history of each device. For example, in the estimation control for the internal combustion engine 71A, the motion manager 45 acquires as the usage history of the internal combustion engine 71A a cumulative rotational speed of the internal combustion engine 71A from when the consumable part of the internal combustion engine 71A started to be used until step S11 is performed. The cumulative rotational speed of the internal combustion engine 71A is the number of revolutions of the crankshaft per unit time expressed in a unit such as "rpm" multiplied by the number of unit times from when the consumable part of the internal combustion engine 71A started to be used until step S11 is performed.

In the estimation control for the motor generator 71B, the following process, for example, is performed. Specifically, the motion manager 45 acquires as the usage history of the motor generator 71B a cumulative amount of power of the motor generator 71B from when the consumable part of the motor generator 71B started to be used until step S11 is performed. The cumulative amount of power of the motor generator 71B is the absolute value of the electrical energy consumed or generated by the motor generator 71B per unit time multiplied by the number of unit times from when the consumable part of the motor generator 71B started to be used until step S11 is performed.

In the estimation control for the brake device 73, the following process, for example, is performed. Specifically, the motion manager 45 acquires as the usage history of the brake device 73 a cumulative value of the braking force on the vehicle 100 generated by the brake device 73 from when the consumable part of the brake device 73 started to be used until step S11 is performed. The cumulative value of the braking force on the vehicle 100 generated by the brake device 73 is the braking force on the vehicle 100 generated by the brake device 73 per unit time multiplied by the number of unit times from when the consumable part of the brake device 73 started to be used until step S11 is performed. In the present embodiment, the usage history of the brake device 73 corresponds to a first usage history. Each of the usage history of the internal combustion engine 71A and the usage history of the motor generator 71B corresponds to a second usage history. After step S11, the process proceeds to step S12.

In step S12, the motion manager 45 acquires a predetermined reference service life and usage start time of the consumable part included in each device. For example, in the estimation control for the internal combustion engine 71A, the motion manager 45 acquires from the storage device 42 the reference service life of the oil for lubricating the internal combustion engine 71A. The motion manager 45 also acquires from the storage device 42 the date and time the oil for lubricating the internal combustion engine 71A was changed as the usage start time.

Similarly, for example, in the estimation control for the motor generator 71B, the motion manager 45 acquires from the storage device 42 the reference service life of the cooling medium for cooling the motor generator 71B. The motion manager 45 also acquires from the storage device 42 the date and time the cooling medium for cooling the motor generator 71B was changed as the usage start time.

For example, in the estimation control for the brake device 73, the motion manager 45 acquires from the storage device 42 the reference service life of the brake pads of the brake device 73. The motion manager 45 also acquires from the storage device 42 the date and time the brake pads of the brake device 73 were replaced as the usage start time. After step S12, the process proceeds to step S13.

In step S13, the motion manager 45 estimates the replacement time of the consumable part included in the device, namely the time to replace the consumable part included in the device, based on the reference service life of the consumable part, the usage start time of the consumable part, and the usage history of the device including the consumable part. For example, in the estimation control for the consumable part included in the internal combustion engine 71A, the motion manager 45 estimates the engine replacement time TE, namely the time to replace the consumable part, based on the reference service life of the consumable part, the usage start time of the consumable part, and the usage history of the internal combustion engine 71A. At this time, the motion manager 45 calculates the rate of increase in cumulative rotational speed of the internal combustion engine 71A by dividing the usage history of the internal combustion engine 71A, namely the cumulative rotational speed of the internal combustion engine 71A, by the period from the usage start time of the consumable part until step S13 is performed. The motion manager 45 also estimates the date and time the cumulative rotational speed of the internal combustion engine 71A will reach the cumulative rotational speed corresponding to the reference service life of the consumable part if the cumulative rotational speed increases at the calculated increase rate. The motion manager 45 then sets the engine replacement time TE to the estimated date and time. The motion manager 45 estimates the motor replacement time TM, namely the time to replace the consumable part included in the motor generator 71B, by a similar method. The motion manager 45 estimates the brake replacement time TB, namely the time to replace the consumable part included in the brake device 73. After step S13, the motion manager 45 ends the current estimation control.

Braking Force Control

Next, braking force control that is performed by the motion manager 45 will be described with reference to FIG. 4. In the present embodiment, the motion manager 45 performs the braking force control every time a request to generate a braking force on the vehicle 100 is made. A situation in which a request to generate a braking force on the vehicle 100 is made is, for example, a situation in which a brake pedal of the vehicle 100 is operated by the driver of the vehicle 100 when the vehicle 100 is in operation according to operations by the driver of the vehicle 100. Another example of the situation in which a request to generate a braking force on the vehicle 100 is made is a situation in which a negative value is output as a requested longitudinal acceleration GXR from the first assistance unit 56 etc. when a driver assistance function of the vehicle 100 has been enabled by the first assistance unit 56 etc.

Figure 4:
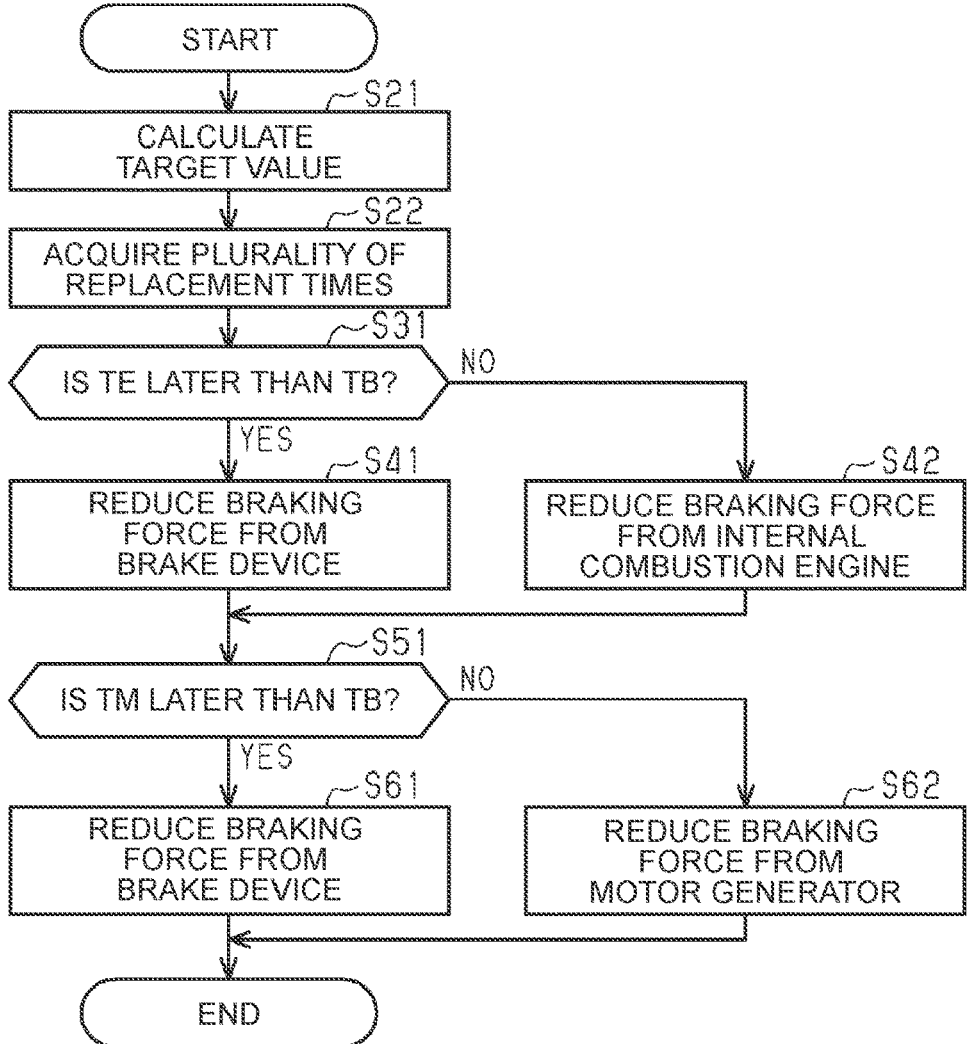
FIG. 4 is a flowchart of braking force control.

As shown in FIG. 4, when the braking force control is started, the motion manager 45 performs step S21. In step S21, the motion manager 45 calculates a target braking force FT that is a target value of the braking force on the vehicle 100. For example, in the situation in which the brake pedal of the vehicle 100 is operated by the driver of the vehicle 100, the motion manager 45 calculates a target braking force FT based on the amount of operation of the brake pedal. For example, in the situation in which a negative value is output as a requested longitudinal acceleration GXR from the first assistance unit 56 etc., the motion manager 45 calculates a target braking force FT based on the requested longitudinal acceleration GXR.

The motion manager 45 calculates an initial value of a target brake braking force FTB, an initial value of a target engine braking force FTE, and an initial value of a target motor braking force FTM by distributing the target braking force FT. At this time, one or two of the initial value of the target brake braking force FTB, the initial value of the target engine braking force FTE, and the initial value of the target motor braking force FTM may be zero. However, the sum of these three initial values is always equal to the target braking force FT. The target brake braking force FTB is a target value of the braking force on the vehicle 100 to be generated by the brake device 73. The target engine braking force FTE is a target value of the braking force on the vehicle 100 to be generated by the internal combustion engine 71A. The target motor braking force FTM is a target value of the braking force on the vehicle 100 to be generated by the motor generator 71B. After step S21, the process proceeds to step S22.

In step S22, the motion manager 45 acquires the brake replacement time TB, the engine replacement time TE, and the motor replacement time TM. After step S22, the process proceeds to step S31.

In step S31, the motion manager 45 determines whether the engine replacement time TE is later than the brake replacement time TB. When the motion manager 45 determines in step S31 that the engine replacement time TE is later than the brake replacement time TB (S31: YES), the process proceeds to step S41. In the present embodiment, the brake replacement time TB corresponds to a first replacement time. The engine replacement time TE corresponds to a second replacement time. Therefore, a necessary condition for the process to proceed to step S41 is that the second replacement time is later than the first replacement time.

In step S41, the motion manager 45 reduces the braking force on the vehicle 100 to be generated by the brake device 73 compared to when the engine replacement time TE is the same as or earlier than the brake replacement time TB. In other words, the motion manager 45 changes the control for the brake device 73 so as to reduce wear of the consumable part included in the brake device 73 compared to when the engine replacement time TE is the same as or earlier than the brake replacement time TB. Specifically, the motion manager 45 reduces the target brake braking force FTB by subtracting a predetermined first correction value α from the initial value of the target brake braking force FTB. However, when the result of subtracting the first correction value α from the initial value of the target brake braking force FTB is a negative value, the motion manager 45 sets the target brake braking force FTB to zero. The motion manager 45 also increases the braking force on the vehicle 100 to be generated by the internal combustion engine 71A compared to when the engine replacement time TE is the same as or earlier than the brake replacement time TB. Specifically, the motion manager 45 increases the target engine braking force FET by adding the absolute value of the difference between the initial value of the target brake braking force FTB and the corrected target brake braking force FTB to the initial value of the target engine braking force FTE. The braking force on the vehicle 100 to be generated by the internal combustion engine 71A is the braking force on the vehicle 100 to be generated by engine braking using the internal combustion engine 71A. After step S41, the process proceeds to step S51.

When the motion manager 45 determines in the above step S31 that the engine replacement time TE is the same as or earlier than the brake replacement time TB (S31: NO), the process proceeds to step S42.

In step S42, the motion manager 45 reduces the braking force on the vehicle 100 to be generated by the internal combustion engine 71A compared to when the engine replacement time TE is later than the brake replacement time TB. Specifically, the motion manager 45 reduces the target engine braking force FTE by subtracting the predetermined first correction value α from the initial value of the target engine braking force FTE. However, when the result of subtracting the first correction value α from the initial value of the target engine braking force FTE is a negative value, the motion manager 45 sets the target engine braking force FTE to zero. The motion manager 45 also increases the braking force on the vehicle 100 to be generated by the brake device 73 compared to when the engine replacement time TE is later than the brake replacement time TB. Specifically, the motion manager 45 increases the target brake braking force FEB by adding the absolute value of the difference between the initial value of the target engine braking force FTE and the corrected target engine braking force FTE to the initial value of the target brake braking force FTB. After step S42, the process proceeds to step S51.

In step S51, the motion manager 45 determines whether the motor replacement time TM is later than the brake replacement time TB. When the motion manager 45 determines in step S51 that the motor replacement time TM is later than the brake replacement time TB (S51: YES), the process proceeds to step S61. In the present embodiment, the brake replacement time TB corresponds to a second replacement time. Therefore, a necessary condition for the process to proceed to step S61 is that the second replacement time is later than the first replacement time.

In step S61, the motion manager 45 reduces the braking force on the vehicle 100 to be generated by the brake device 73 compared to when the motor replacement time TM is the same as or earlier than the brake replacement time TB. In other words, the motion manager 45 changes the control for the brake device 73 so as to reduce wear of the consumable part included in the brake device 73 compared to when the motor replacement time TM is the same as or earlier than the brake replacement time TB. Specifically, the motion manager 45 reduces the target brake braking force FTB by subtracting a predetermined second correction value β from the target brake braking force FTB corrected in step S41 or step S42. However, when the result of subtracting the second correction value β from the target brake braking force FTB corrected in step S41 or step S42 is a negative value, the motion manager 45 sets the target brake braking force FTB to zero. The motion manager 45 also increases the braking force on the vehicle 100 to be generated by the motor generator 71B compared to when the motor replacement time TM is the same as or earlier than the brake replacement time TB. Specifically, the motion manager 45 calculates the absolute value of the difference between the target brake braking force FTB corrected in step S41 or step S42 and the target brake braking force FTB corrected in step S61. The motion manager 45 then increases the target motor braking force FTM by adding the calculated absolute value to the initial value of the target motor braking force FTM. The motion manager 45 controls the brake device 73, the internal combustion engine 71A, and the motor generator 71B according to the final target brake braking force FTB, the final target engine braking force FTE, and the final target motor braking force FTM. As a result, the braking force required for the vehicle 100 is achieved. In the present embodiment, the sum of the final target brake braking force FTB, the final target engine braking force FTE, and the final target motor braking force FTM is equal to the target braking force FT. After step S61, the motion manager 45 ends the current braking force control.

When the motion manager 45 determines in the above step S51 that the motor replacement time TM is the same as or earlier than the brake replacement time TB (S51: NO), the process proceeds to step S62.

In step S62, the motion manager 45 reduces the braking force on the vehicle 100 to be generated by the motor generator 71B compared to when the motor replacement time TM is later than the brake replacement time TB. Specifically, the motion manager 45 reduces the target motor braking force FTM by subtracting the predetermined second correction value β from the initial value of the target motor braking force FTM. However, when the result of subtracting the second correction value β from the initial value of the target motor braking force FTM is a negative value, the motion manager 45 sets the target motor braking force FTM to zero. The motion manager 45 also increases the braking force on the vehicle 100 to be generated by the brake device 73 compared to when the motor replacement time TM is later than the brake replacement time TB. Specifically, the motion manager 45 calculates the absolute value of the difference between the initial value of the target motor braking force FTM and the corrected target motor braking force FTM. The motion manager 45 then increases the target brake braking force FTB by adding the calculated absolute value to the target brake braking force FTB corrected in step S41 or step S42. The motion manager 45 controls the brake device 73, the internal combustion engine 71A, and the motor generator 71B according to the final target brake braking force FTB, the final target engine braking force FTE, and the final target motor braking force FTM. As a result, the braking force required for the vehicle 100 is achieved. In the present embodiment, the sum of the final target brake braking force FTB, the final target engine braking force FTE, and the final target motor braking force FTM is equal to the target braking force FT. In the present embodiment, the second correction value β is the same as the first correction value α. After step S62, the motion manager 45 ends the current braking force control.

Functions of Embodiment

In the vehicle 100, the brake replacement time TB, the engine replacement time TE, and the motor replacement time TM are estimated by performing the estimation control. It is assumed that the engine replacement time TE and the motor replacement time TM are later than the brake replacement time TB. When a request to generate a braking force on the vehicle 100 is made thereafter, the braking force control is performed. Since the result of determination of the motion manager 45 in step S31 is YES, the process of the braking force control proceeds to step S41. In step S41, the motion manager 45 changes the control for the brake device 73 so as to reduce wear of the consumable part included in the brake device 73 compared to when the engine replacement time TE is the same as or earlier than the brake replacement time TB. Since the result of determination of the motion manager 45 in step S51 is YES, the process proceeds to step S61. In step S61, the motion manager 45 changes the control for the brake device 73 so as to reduce wear of the consumable part included in the brake device 73 compared to when the motor replacement time TM is the same as or earlier than the brake replacement time TB.

Effects of Embodiment (1) According to the present embodiment, since the control for the brake device 73 is changed in step S41 etc., the brake replacement time TB is pushed back compared to the control that is performed when the engine replacement time TE and the motor replacement time TM are the same as or earlier than the brake replacement time TB. That is, the brake replacement time TB gets closer to the engine replacement time TE and the motor replacement time TM. This increases the possibility that the consumable part included in the brake device 73 can be replaced at the same maintenance timing as the consumable part included in the internal combustion engine 71A and the consumable part included in the motor generator 71B. As a result, a reduction in overall frequency of maintenance of the vehicle 100 can be expected.

(2) In step S41, the motion manager 45 reduces the braking force on the vehicle 100 to be generated by the brake device 73 compared to when the engine replacement time TE is the same as or earlier than the brake replacement time TB. The motion manager 45 also increases the braking force on the vehicle 100 to be generated by the internal combustion engine 71A compared to when the engine replacement time TE is the same as or earlier than the brake replacement time TB. The load on the brake device 73 when generating the braking force on the vehicle 100 can thus be reduced while reducing a decrease in overall braking force that is applied to the vehicle 100.

(3) In step S61, the motion manager 45 reduces the braking force on the vehicle 100 to be generated by the brake device 73 compared to when the motor replacement time TM is the same as or earlier than the brake replacement time TB. The motion manager 45 also increases the braking force on the vehicle 100 to be generated by the motor generator 71B compared to when the motor replacement time TM is the same as or earlier than the brake replacement time TB. The load on the brake device 73 when generating the braking force on the vehicle 100 can thus be reduced while reducing a decrease in overall braking force that is applied to the vehicle 100.

Modifications

The above embodiment can be modified as follows. The above embodiment and the following modifications can be combined as long as no technical contradiction arises.

In the above embodiment, the estimation control may be modified. For example, in step S13, the values that are used to estimate the replacement time may be changed. As a specific example, the motion manager 45 may estimate the replacement time of the consumable part included in the device, namely the time to replace the consumable part included in the device, based on other values in addition to the reference service life of the consumable part, the usage start time of the consumable part, and the usage history of the device including the consumable part.

In the above embodiment, the braking force control may be modified. For example, either steps S31 to S42 or steps S51 to S62 may be omitted. As a specific example, it is assumed that the vehicle 100 includes only the internal combustion engine 71A rather than both the internal combustion engine 71A and the motor generator 71B as the powertrain device 71. In this case, steps S51 to S62 can be omitted.

Similarly, as a specific example, it is assumed that the vehicle 100 includes only the motor generator 71B rather than both the internal combustion engine 71A and the motor generator 71B as the powertrain device 71. In this case, steps S31 to S42 can be omitted.

For example, one of steps S41 and S42 may be omitted. Even in this case, when the motion manager 45 performs the other step, the control for the brake device 73 is changed so as to reduce wear of the consumable part included in the brake device 73 compared to when the engine replacement time TE is the same as or earlier than the brake replacement time TB. Similarly, one of steps S61 and S62 may be omitted.

For example, in step S41, the absolute value of the amount by which the braking force on the vehicle 100 to be generated by the internal combustion engine 71A is increased may be different from the absolute value of the amount by which the braking force on the vehicle 100 to be generated by the brake device 73 is reduced. Even in this case, a decrease in overall braking force that is applied to the vehicle 100 can be reduced by the motion manager 45 increasing the braking force on the vehicle 100 to be generated by the internal combustion engine 71A. Similarly, step S42, step S61, and step S62 may be modified.

In the above embodiment, the configuration of the vehicle 100 may be modified. For example, the ECU that implements the function of the motion manager 45 may be other than the brake ECU 40. As a specific example, instead of the brake ECU 40, the execution device 11 of the central ECU 10 may implement the function of the motion manager 45 by executing the motion manager application 45A stored in the storage device 12. That is, the central ECU 10, the powertrain ECU 20, the steering ECU 30, the brake ECU 40, and the advanced driver assistance ECU 50 may be used as an information processing device.

For example, the consumable part included in the internal combustion engine 71A is not limited to the oil for lubricating each part of the internal combustion engine 71A, and may be changed. Specifically, a part that is included in the internal combustion engine 71A or used in the internal combustion engine 71A and that is worn as the internal combustion engine 71A operates may be the consumable part included in the internal combustion engine 71A. Similarly, the consumable part included in the motor generator 71B is not limited to the cooling medium for cooling each part of the motor generator 71B, and may be changed. The consumable part included in the brake device 73 is not limited to the brake pads, and may be changed.

For example, the first device is not limited to the brake device 73, and may be changed. As a specific example, either or both of the internal combustion engine 71A and the motor generator 71B may be used as the first device. For example, the second device is not limited to the internal combustion engine 71A and the motor generator 71B, and may be changed. As a specific example, the brake device 73 may be used as the second device.

What is claimed is:

1. An information processing device comprising a processor configured to:

acquire a usage history of a first device included in a vehicle as a first usage history, acquire a usage history of a second device included in the vehicle as a second usage history, the second device being a device different from the first device, estimate a first replacement time based on the first usage history, the first replacement time being a time to replace a first consumable part included in the first device, estimate a second replacement time based on the second usage history, the second replacement time being a time to replace a second consumable part included in the second device, and when a necessary condition that the second replacement time is later than the first replacement time is satisfied, change control of the first device such that wear of the first consumable part is reduced compared to when the second replacement time is the same as or earlier than the first replacement time, wherein the first device is a mechanical brake device configured to generate a braking force on the vehicle;

the second device is an internal combustion engine configured to function as a driving source for the vehicle; and the processor is configured to, when a necessary condition that the second replacement time is later than the first replacement time is satisfied, achieve the braking force required for the vehicle by reducing the braking force on the vehicle to be generated by the brake device and increasing the braking force on the vehicle to be generated by engine braking using the internal combustion engine compared to when the second replacement time is the same as or earlier than the first replacement time.

2. The information processing device according to claim 1, wherein:

the first device is a mechanical brake device configured to generate a braking force on the vehicle;

the second device is a motor generator configured to function as a driving source for the vehicle by operating as an electric motor and to generate the braking force on the vehicle by operating as an electric generator; and the processor is configured to, when a necessary condition that the second replacement time is later than the first replacement time is satisfied, achieve the braking force required for the vehicle by reducing the braking force on the vehicle to be generated by the brake device and increasing the braking force on the vehicle to be generated by the motor generator compared to when the second replacement time is the same as or earlier than the first replacement time.

3. A non-transitory storage medium storing instructions that are executable by one or more processors and that cause the one or more processors to perform functions comprising causing an information processing device to:

acquire a usage history of a first device included in a vehicle as a first usage history, acquire a usage history of a second device included in the vehicle as a second usage history, the second device being a device different from the first device, estimate a first replacement time based on the first usage history, the first replacement time being a time to replace a first consumable part included in the first device, estimate a second replacement time based on the second usage history, the second replacement time being a time to replace a second consumable part included in the second device, and when a necessary condition that the second replacement time is later than the first replacement time is satisfied, change control of the first device such that wear of the first consumable part is reduced compared to when the second replacement time is the same as or earlier than the first replacement time, wherein:

the first device is a mechanical brake device configured to generate a braking force on the vehicle;

the second device is an internal combustion engine configured to function as a driving source for the vehicle; and when a necessary condition that the second replacement time is later than the first replacement time is satisfied, achieve the braking force required for the vehicle by reducing the braking force on the vehicle to be generated by the brake device and increasing the braking force on the vehicle to be generated by engine braking using the internal combustion engine compared to when the second replacement time is the same as or earlier than the first replacement time.

4. An information processing method comprising causing an information processing device to:

acquire a usage history of a first device included in a vehicle as a first usage history, acquire a usage history of a second device included in the vehicle as a second usage history, the second device being a device different from the first device, estimate a first replacement time based on the first usage history, the first replacement time being a time to replace a first consumable part included in the first device, estimate a second replacement time based on the second usage history, the second replacement time being a time to replace a second consumable part included in the second device, and when a necessary condition that the second replacement time is later than the first replacement time is satisfied, change control of the first device such that wear of the first consumable part is reduced compared to when the second replacement time is the same as or earlier than the first replacement time, wherein:

the first device is a mechanical brake device configured to generate a braking force on the vehicle;

the second device is an internal combustion engine configured to function as a driving source for the vehicle; and when a necessary condition that the second replacement time is later than the first replacement time is satisfied, achieve the braking force required for the vehicle by reducing the braking force on the vehicle to be generated by the brake device and increasing the braking force on the vehicle to be generated by engine braking using the internal combustion engine compared to when the second replacement time is the same as or earlier than the first replacement time.

\*    \*    \*    \*    \*